(12) United States Patent
Miller

(10) Patent No.: US 12,371,935 B1
(45) Date of Patent: Jul. 29, 2025

(54) TAILGATE ASSEMBLY

(71) Applicant: NISSAN NORTH AMERICA, INC., Franklin, TN (US)

(72) Inventor: Adam Miller, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 18/425,941

(22) Filed: Jan. 29, 2024

(51) Int. Cl.
*E05D 15/10* (2006.01)
*B62D 33/027* (2006.01)
*B62D 33/03* (2006.01)
*B62D 33/037* (2006.01)

(52) U.S. Cl.
CPC ....... *E05D 15/101* (2013.01); *B62D 33/0273* (2013.01); *B62D 33/03* (2013.01); *B62D 33/037* (2013.01); *E05Y 2900/544* (2013.01)

(58) Field of Classification Search
CPC ........... E05Y 2900/544; E05Y 2201/64; E05Y 2900/531; E05Y 2900/546; B62D 33/0273; B62D 33/023; B62D 33/027; B62D 33/03; B62D 33/037; E05D 2015/1031; E05D 15/101; B60J 5/06; B60J 5/12
See application file for complete search history.

(56) References Cited

U.S. PATENT DOCUMENTS

| | | |
|---|---|---|
| 3,903,648 A | 9/1975 | Maneck |
| 4,337,596 A | 7/1982 | Kern et al. |
| 4,561,690 A | 12/1985 | Shinjo et al. |
| 8,186,743 B2 | 5/2012 | Anderson et al. |
| 9,988,103 B1 * | 6/2018 | Mouch ................ B62D 33/0273 |
| 10,358,854 B1 * | 7/2019 | Guygaew ................ E05D 15/22 |
| 10,480,233 B2 * | 11/2019 | Vega ..................... E05D 15/1081 |
| 11,214,318 B1 * | 1/2022 | Parker .................. B62D 33/037 |
| 11,639,201 B2 * | 5/2023 | Selle .......................... B60R 3/02 |
| | | 296/51 |
| 11,643,152 B2 * | 5/2023 | Parker .................. B62D 33/037 |
| | | 296/50 |
| 11,648,993 B2 * | 5/2023 | Gase ..................... E05F 15/605 |
| | | 296/50 |
| 11,679,817 B2 * | 6/2023 | Go ....................... B62D 33/037 |
| | | 296/50 |
| 2006/0197357 A1 * | 9/2006 | Catania ................... E05D 15/58 |
| | | 296/155 |
| 2020/0391645 A1 * | 12/2020 | Ieradi ...................... B60P 1/006 |
| 2021/0138880 A1 * | 5/2021 | Lee .......................... E05B 83/38 |
| 2021/0245818 A1 * | 8/2021 | Van Norman ..... B62D 33/0273 |
| 2021/0403097 A1 * | 12/2021 | Gase .................. B62D 33/0273 |
| 2022/0161870 A1 * | 5/2022 | Horner .................. B60Q 1/307 |
| 2023/0257032 A1 * | 8/2023 | Harmon .................. B60P 7/135 |
| | | 296/26.11 |
| 2024/0286687 A1 * | 8/2024 | Babymony .......... E05D 15/1047 |
| 2024/0294214 A1 * | 9/2024 | Ruhs ........................ B25H 1/04 |

* cited by examiner

Primary Examiner — Justin B Rephann
(74) Attorney, Agent, or Firm — Global IP Counselors, LLP

(57) ABSTRACT

A tailgate assembly includes a tailgate frame and a sliding door. The tailgate frame has a first portion and a second portion. The first portion has a rearward facing tailgate panel that covers at least half of the tailgate frame. The second portion defines a door opening and a lower track. The sliding door is supported by the lower track such that the sliding door is movable between a closed orientation and an open orientation.

14 Claims, 8 Drawing Sheets

TAILGATE ASSEMBLY

BACKGROUND

Technical Field

The present disclosure generally relates to a tailgate assembly. More specifically, the present disclosure relates to a tailgate assembly that includes tailgate frame that supports a sliding door that slides between an open orientation exposing an opening in the tailgate frame and a closed orientation covering the opening in the tailgate frame.

Background Information

The tailgate of a pickup truck typically pivots about a horizontally extending pivot shaft (or shafts) such that the tailgate pivots between an upright closed orientation and an approximately horizontal open orientation.

SUMMARY

One object of the present disclosure is to provide easy access to a cargo area of a cargo structure without moving a tailgate assembly from a closed upright orientation to an open reclined orientation.

It has been discovered that in order to achieve the above object, providing a tailgate assembly with a sliding door allows for easy access to the cargo area of a cargo structure.

In view of the state of the known technology, one aspect of the present disclosure is to provide a tailgate assembly with a tailgate frame and a sliding door. The tailgate frame has a first portion and a second portion. The first portion has a rearward facing tailgate panel that covers at least half of the tailgate frame. The second portion defines a door opening and a lower track. The sliding door is supported by the lower track such that the sliding door is movable between a closed orientation and an open orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
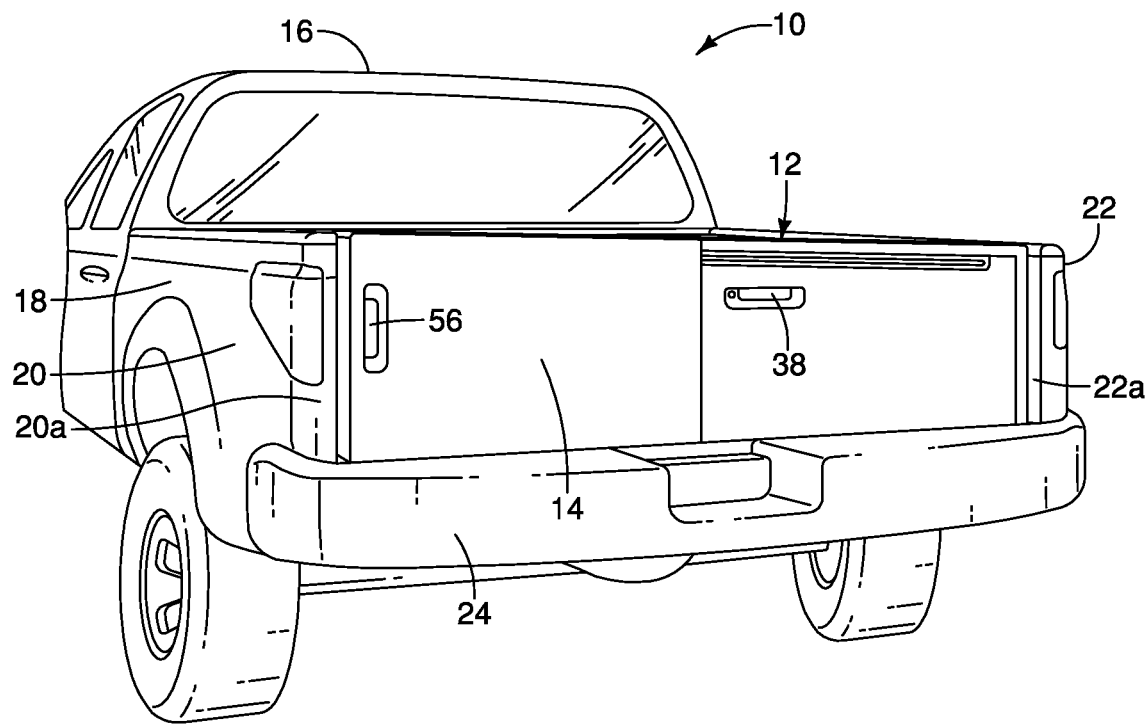
FIG. 1 is a rear perspective view of a vehicle having a cargo structure with a tailgate assembly shown in a closed upright orientation, the tailgate assembly including a sliding door shown in a closed orientation in accordance with a first embodiment.

Referring initially to FIG. 1, a vehicle 10 having a tailgate assembly 12 with a sliding door 14 is illustrated in accordance with a first embodiment.

The vehicle 10 is a pickup truck that includes a cabin structure 16 and a cargo structure 18 with a cargo area. The cargo structure 18 includes side walls 20 and 22 and a bumper assembly 24. The rear ends 20a and 22a define a tailgate opening 24 therebetween.

Figure 2:
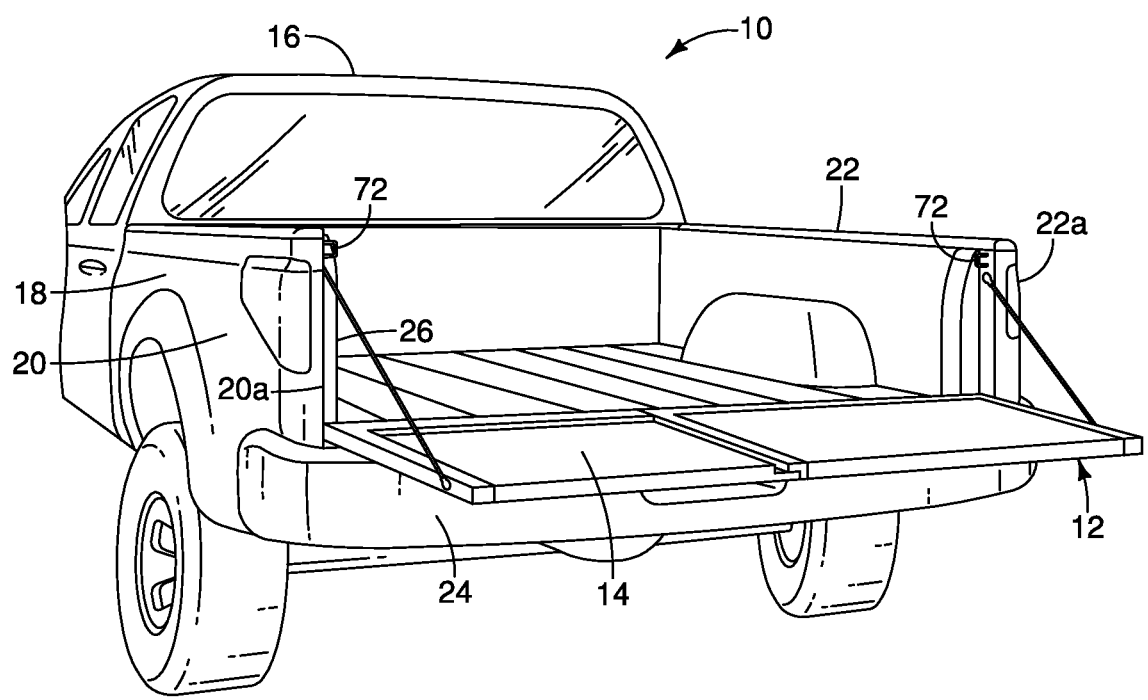
FIG. 2 is another rear perspective view of the vehicle showing the tailgate assembly shown in an open reclined orientation, the sliding door of the tailgate assembly in the closed orientation relative to the tailgate assembly in accordance with the first embodiment.

The tailgate assembly 12 is movable between a closed upright orientation (FIG. 1) and an open reclined orientation (FIG. 2). The tailgate assembly 12 includes a tailgate frame 30 and the sliding door 14. In the closed upright orientation, the cargo area of the cargo structure 18 is blocked from a rearward end thereof by the tailgate assembly 12. In the open reclined orientation, the cargo area of the cargo structure 18 is fully exposed from the rearward end thereof.

Figure 3:
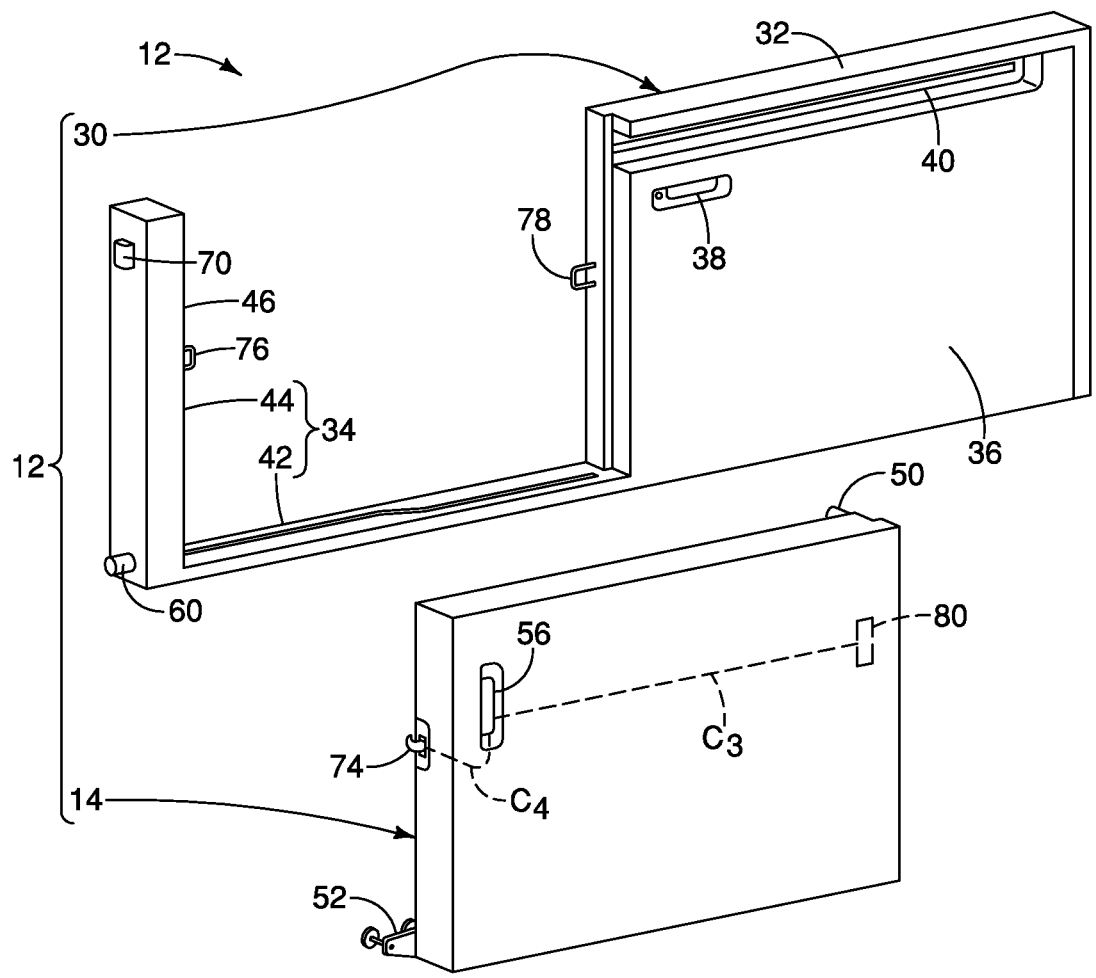
FIG. 3 is a perspective exploded view of the tailgate assembly showing the sliding door separated from a tailgate frame of the tailgate assembly in accordance with the first embodiment.
Figure 4:
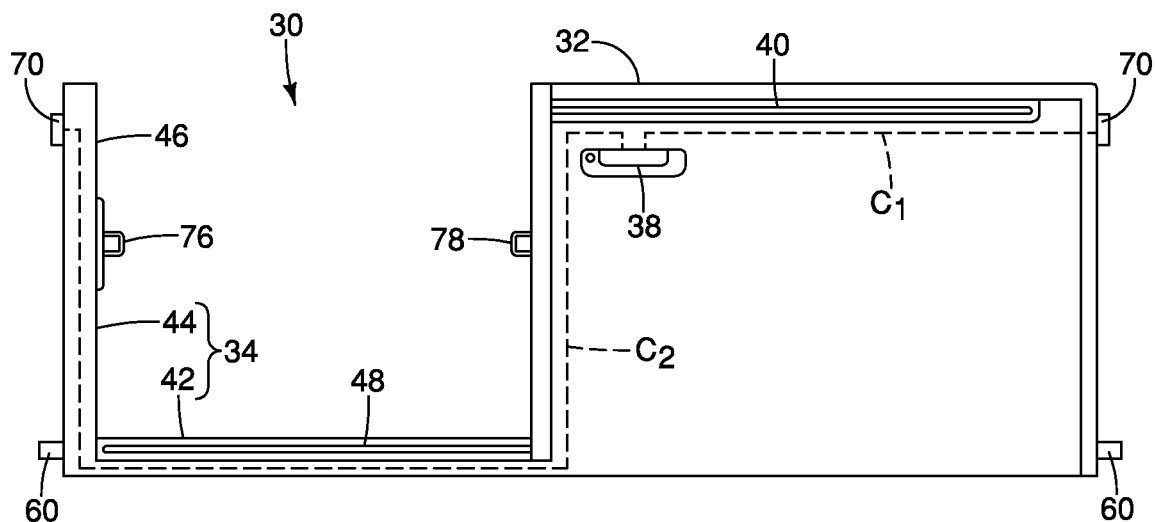
FIG. 4 is a rear view of the tailgate assembly showing the sliding door removed from the tailgate frame of the tailgate assembly in accordance with the first embodiment.
Figure 5:
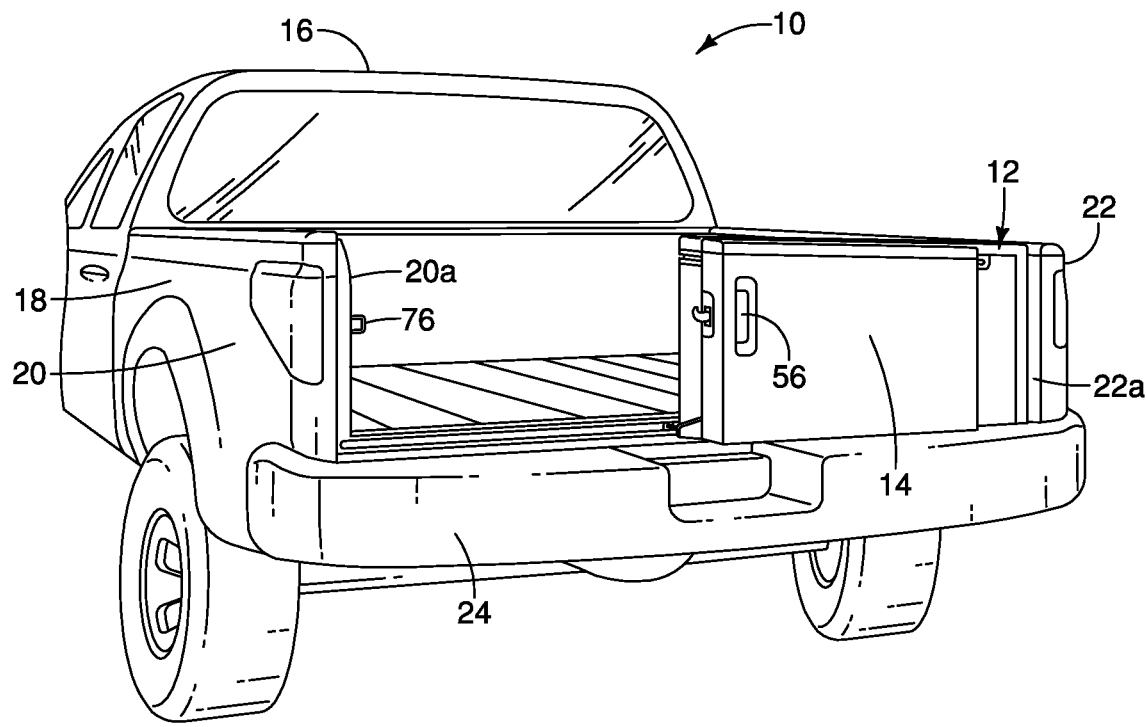
FIG. 5 is a perspective rear view of the vehicle showing the tailgate assembly with the sliding door slid to the open orientation in accordance with the first embodiment.

As shown in FIGS. 3 and 4, the tailgate frame 30 has a first portion 32 and a second portion 34. The first portion 32 has a rearward facing tailgate panel 36 covering at least half of the tailgate frame 12. The tailgate panel 36 covers various upright, horizontal and angled frame elements that define the first portion 32 of the tailgate frame 30. More specifically, the tailgate panel 36 covers the first portion 32 concealing most of the above mentioned frame elements (not shown) of the tailgate frame 30. The tailgate panel 36 also includes a door handle 38 and an upper track 40 configured to support the sliding door 14 for sliding movement between a closed orientation (FIG. 1) and an open orientation (FIG. 5).

With the sliding door 14 being in the closed orientation, the cargo area of the cargo structure 18 remains blocked from the rearward end thereof. With the sliding door 14 in the open orientation, a door opening 46 exposes only a portion of the rear end of the cargo area of the cargo structure 18 providing easy access to the cargo area without opening and lowering the tailgate assembly 12 to the open reclined orientation.

The second portion 32 of the tailgate frame 30 includes a sill section 42 and an upright side section 44 (also referred to as the upwardly extending member 44 relative to the tailgate assembly 12 being in the closed upright orientation). The sill section 42 (also referred to as the sill portion 42), the upright side section 44 and an adjacent end of the first portion 32 define the door opening 46 and a lower track 48. The lower track 48 extends along the sill section 42. The sliding door 14 is supported on the lower track 48 and the upper track 40 such that the sliding door 14 is movable between the closed orientation (FIG. 1) and the open orientation FIG. 5.

The sliding door 14 includes a main panel with an upper slider mechanism 50 and a lower slider mechanism 52. The upper slider mechanism 50 is configured and dimensioned to slide along the upper track 40 between the closed orientation and the open orientation. The lower slider mechanism 52 is configured and dimensioned to slide along the lower track 48 as the sliding door 14 moves between the closed orientation and the open orientation.

Figure 6:
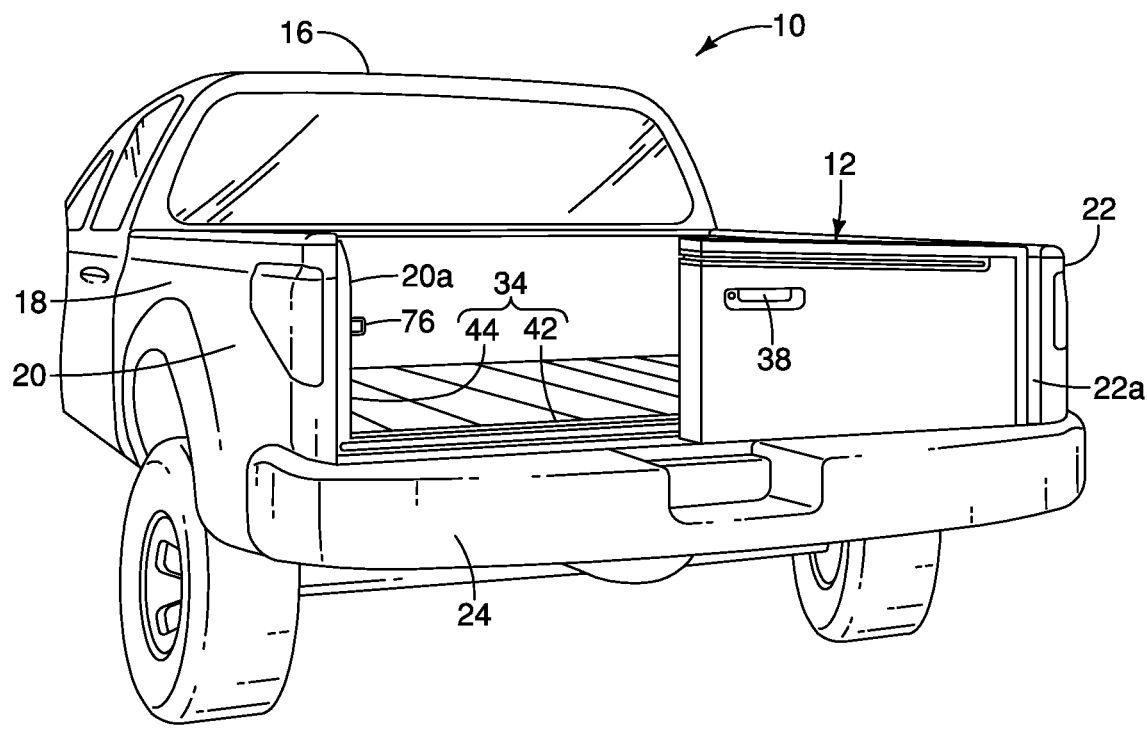
FIG. 6 is another perspective rear view of the vehicle showing the tailgate assembly with removed from the tailgate frame of the tailgate assembly in accordance with the first embodiment.
Figure 9:
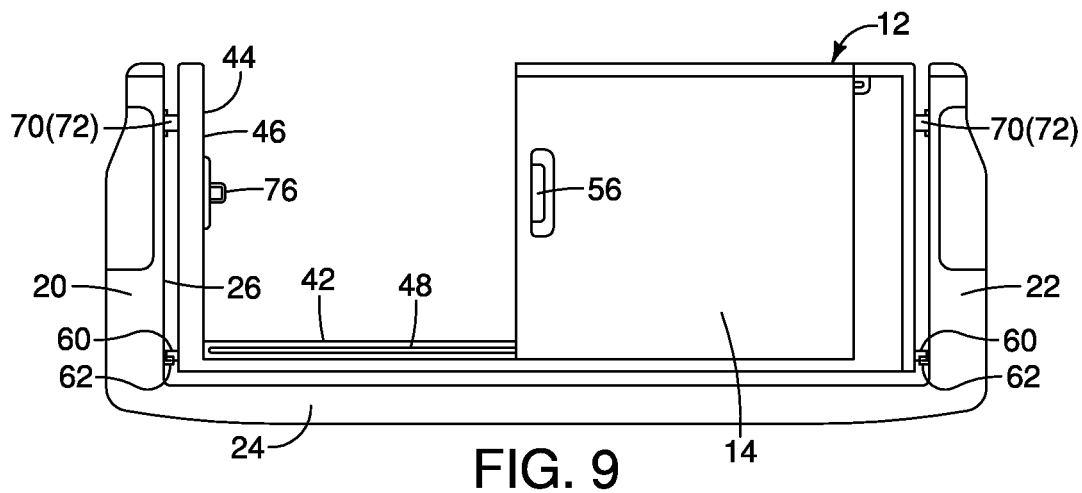
FIG. 9 is yet another rear view of the cargo structure of the vehicle showing the tailgate assembly in the closed upright orientation and the sliding door in the open orientation exposing the door opening in the tailgate frame in accordance with the first embodiment.

In the closed orientation, the sliding door 14 covers the door opening 46. In the open orientation, the sliding door 14 overlays the tailgate panel 36 of the first portion 32 of the tailgate frame 30, as shown in FIGS. 5, 6 and 9.

The upper track 40, the upper slider mechanism 50, the lower track 48 and the lower slider mechanism 52 are configured such that movement of the sliding door 14 is guided along the upper track 40 and the lower track 48 by the upper slider mechanism 50 and the lower slider mechanism 52, respectively. Basically, the movement of the sliding door 14 is similar to movement and operation that is generally consistent with the operation of conventional side sliding doors in conventional passenger, family vans, minivans and micro-buses.

Figure 10:
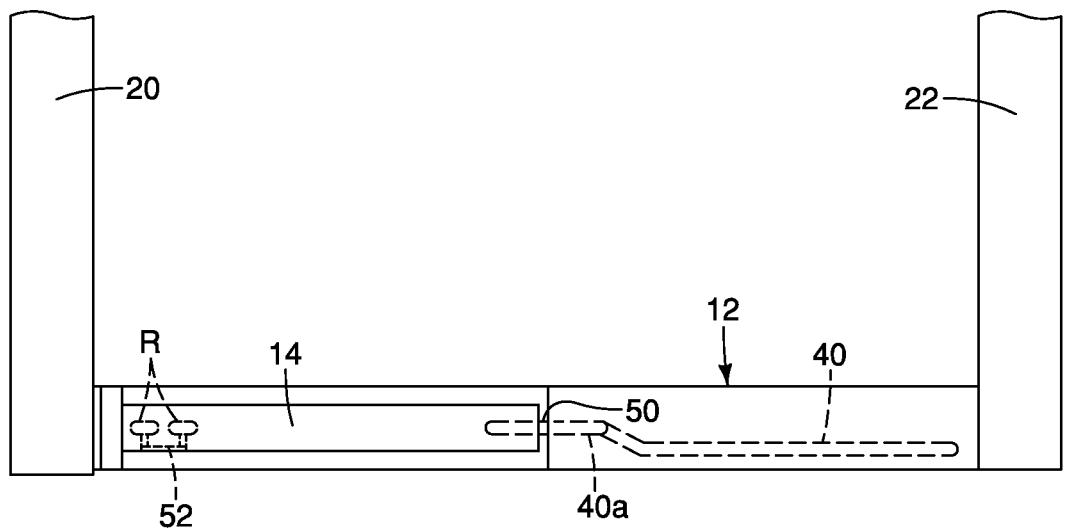
FIG. 10 is a top view of the cargo structure showing the tailgate assembly in the closed upright orientation and the sliding door in the closed orientation in accordance with the first embodiment.
Figure 11:
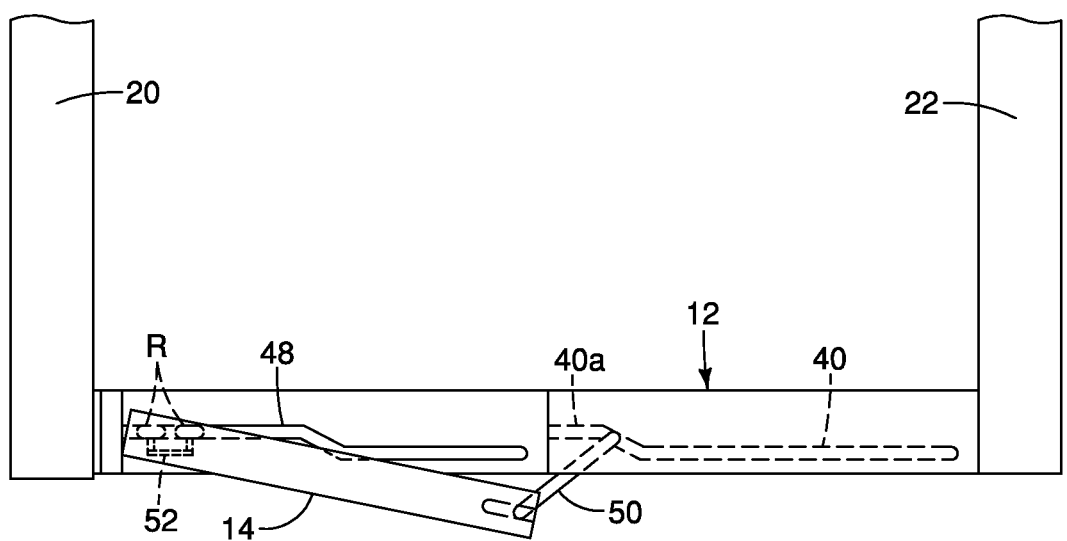
FIG. 11 is another top view of the cargo structure showing the tailgate assembly in the closed upright orientation and the sliding door in an intermediate orientation between the closed and open orientations in accordance with the first embodiment.

The upper track 40 is generally linear and includes an inboard area 40a with sufficient space for the upper slider mechanism 50 to pivot as the sliding door 14 is moved to the closed orientation from the open orientation, as shown in FIG. 11. The upper track 40 can be linear, but as shown in the first embodiment in FIGS. 10 and 11, the upper track 40 can also be shaped with the inboard area 40a being offset from the remainder of the upper track 40.

Figure 12:
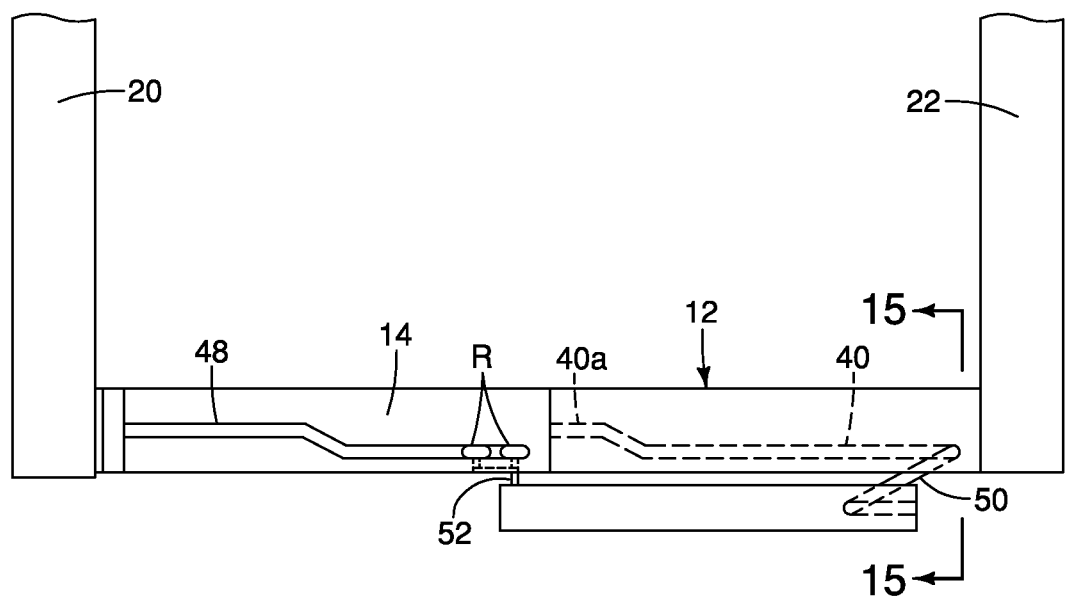
FIG. 12 is a top view of the cargo structure showing the tailgate assembly in the closed upright orientation and the sliding door moved to the open orientation in accordance with the first embodiment.

As shown in FIG. 11, the lower track 48 is non-linear but rather includes two linear sections that are offset from one another such that the sliding door 14 can be displaced rearward as the sliding door 14 moves from the closed orientation shown in FIG. 10 to the open orientation shown in FIG. 12. The lower slider mechanism 52 includes a support bar with rollers R that are disposed within the lower track 48. The support bar is installed to the end of a pivot arm that pivots relative an outboard bottom section of the sliding door 14 such that the outboard section of the sliding door 14 can pivot outward as is move to the open orientation shown in FIG. 12.

The tailgate frame 30 includes support rods 60 located at opposite lower sides thereof such that the tailgate frame 30 pivots about an axis defined by the support rods 60 between the upright closed orientation (FIG. 1) and the inclined open orientation (FIG. 2). The support rods 60 are retained and supported by pivot supports 62 that are fixed to respective ones of lower ends of the side walls 20 and 22 within the tailgate opening 26.

Figure 7:
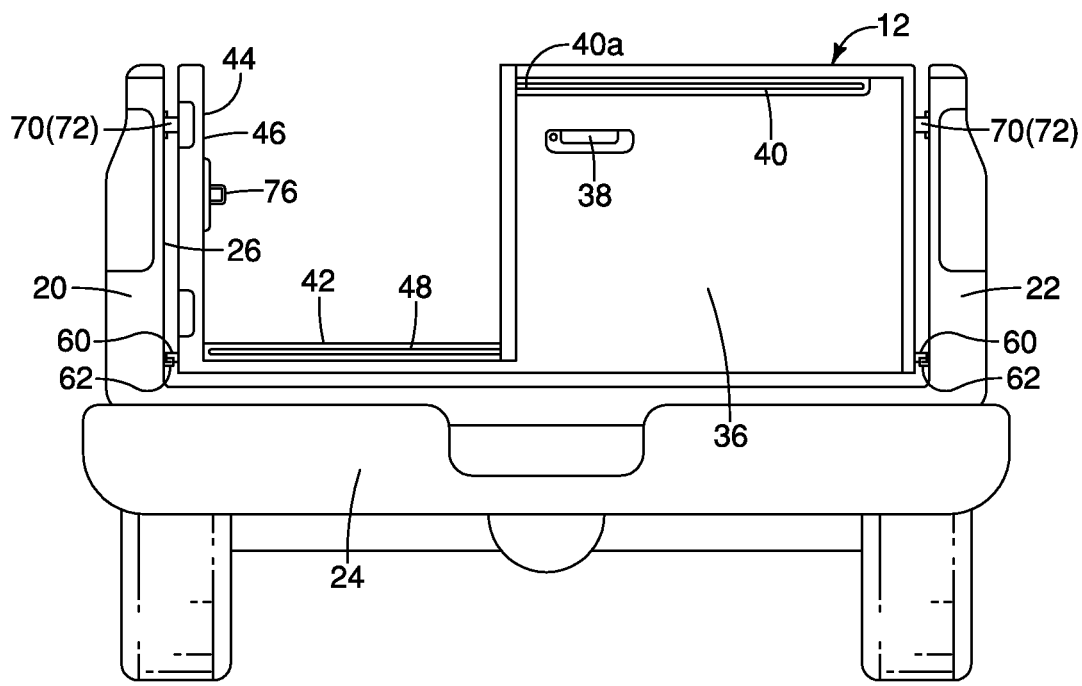
FIG. 7 is a rear view of the vehicle showing the tailgate assembly in the closed upright orientation with the sliding door removed from the tailgate frame of the tailgate assembly showing a door opening in the tailgate frame in accordance with the first embodiment.
Figure 8:
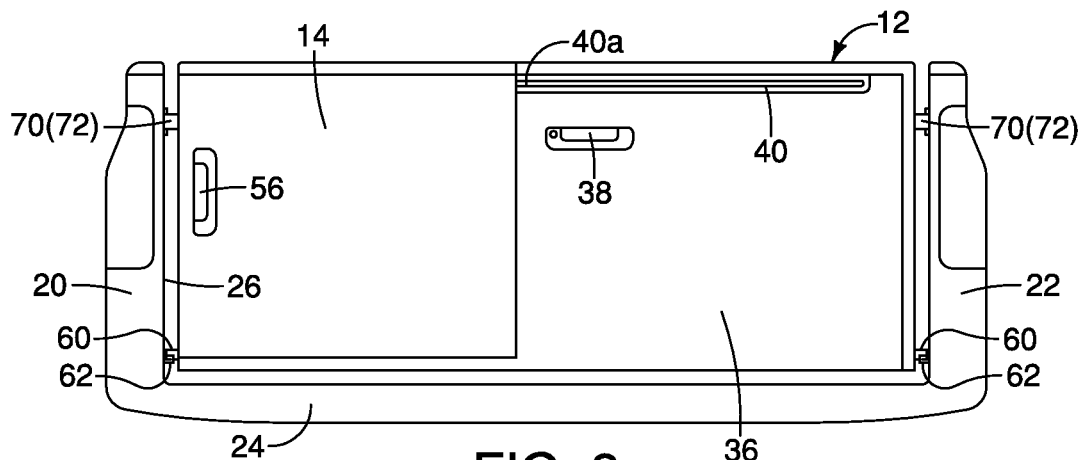
FIG. 8 is another rear view of the cargo structure of the vehicle showing the tailgate assembly in the closed upright orientation and the sliding door in the closed orientation concealing the door opening in the tailgate frame in accordance with the first embodiment.

As shown in FIGS. 7-9, the tailgate frame 30 includes latch mechanisms 70 at opposite upper sides thereof such that with the tailgate frame 30 in the upright closed orientation the latch mechanisms 70 engage strikers 72 located at opposite sides of a cargo area structure retaining the tailgate from in the upright closed orientation, the latch mechanisms being releasable such that in a released orientation the tailgate is free to pivot to the inclined open orientation.

As shown in FIG. 4, the door handle 38 is mechanically connected to each of the latch mechanisms 70 via cables $C_1$ and $C_2$. The door handle 38 and the cables $C_1$ and $C_2$ are configured to release the latch mechanisms 70 from the strikers 72 such that the tailgate assembly 12 can be moved from the closed upright orientation to the open reclined orientation.

Figure 13:
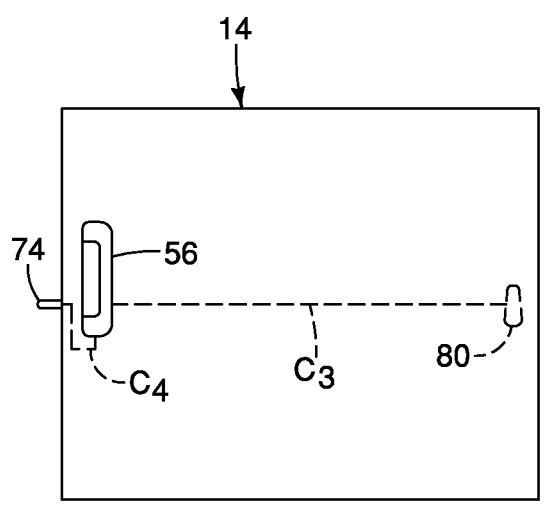
FIG. 13 is a rear view of the sliding door removed from the tailgate assembly and the vehicle in accordance with the first embodiment.
Figure 14:
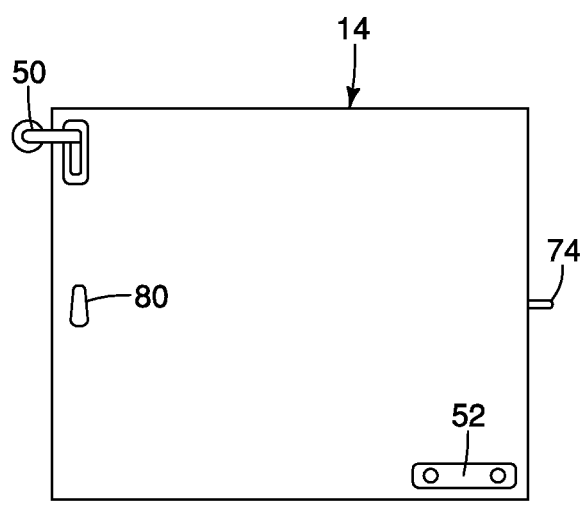
FIG. 14 is a front view of the sliding door removed from the tailgate assembly and the vehicle in accordance with the first embodiment.
Figure 15:
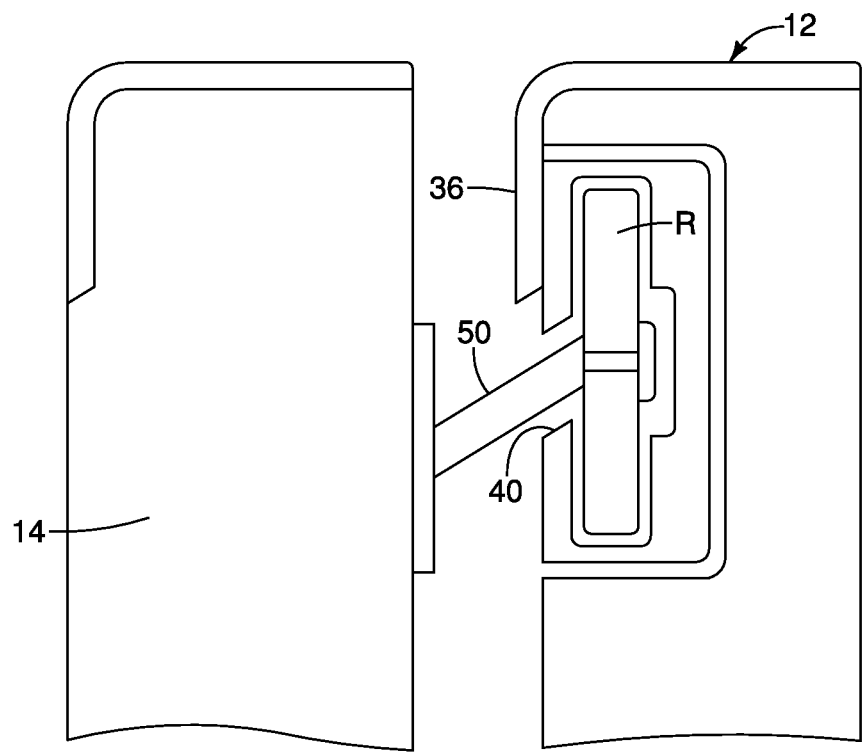
FIG. 15 is a cross-sectional view of the tailgate assembly showing an upper slider mechanism attached to the sliding door and positioned within an upper track of the tailgate frame of the tailgate assembly in accordance with the first embodiment.
Figure 16:
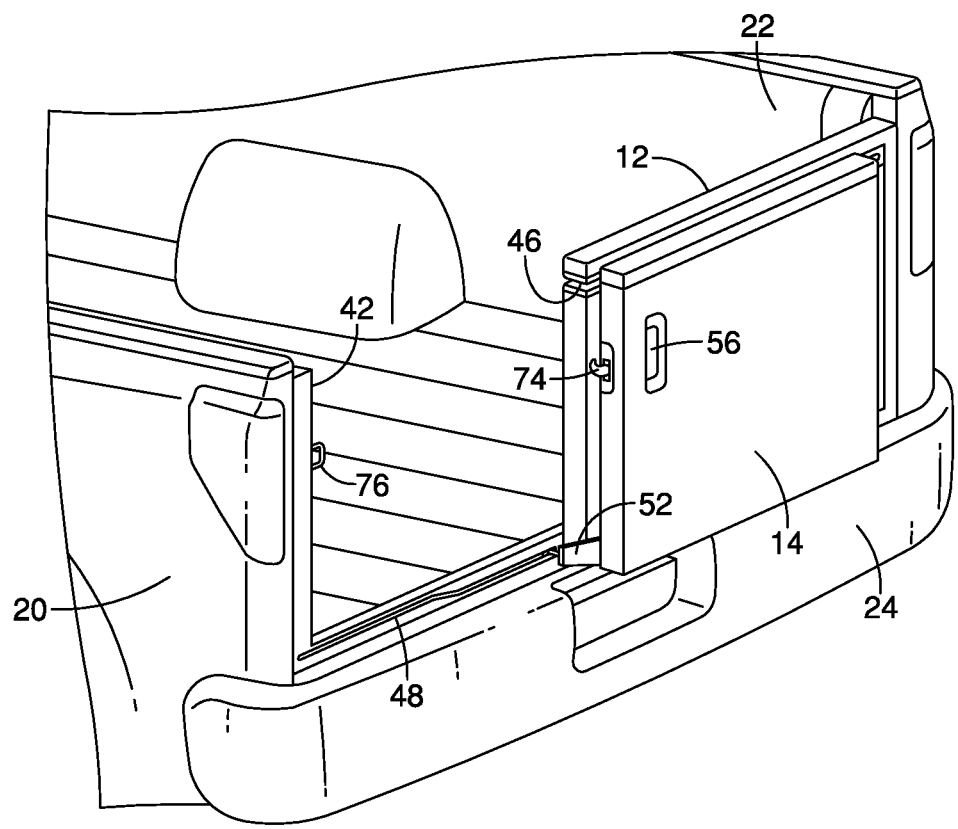
FIG. 16 is a perspective view of the cargo structure and the tailgate assembly showing a lower track of the tailgate frame of the tailgate assembly and a lower slider mechanism of the sliding door that engages the lower track of the tailgate frame in accordance with the first embodiment.

As shown in FIGS. 3, 13 and 14, the sliding door 14 includes latch mechanisms 74 and 80 operated by a sliding door handle 56. The door handle 56 is connected to the latch mechanism 80 via cables $C_3$ and $C_4$. The door opening 46 of the second portion 34 of the tailgate frame 30 includes strikers 76 and 68. The door handle 56 and the cables $C_3$ and $C_4$ are configured to release the latch mechanisms 74 from the striker 76 and the latch mechanism 80 from the striker 78 such that the sliding door 14 can be moved from the closed orientation (FIGS. 1, 8 and 10), past the intermediate orientation (FIG. 11) to the open orientation (FIGS. 5, 9 and 16).

In an alternative embodiment, tailgate assembly 12 can be configured and constructed such that the sliding door 14 moves from the closed orientation to an open orientation where the sliding door 14 is located with the cargo area of the cargo structure 18 instead of being located rearward of the tailgate assembly 12.

Second Embodiment

Figure 17:
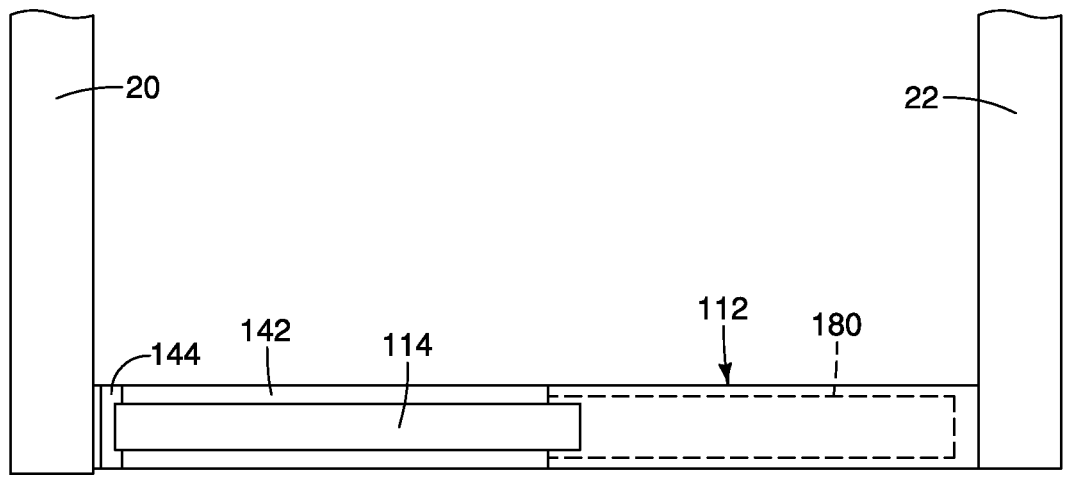
FIG. 17 is a top view of a cargo structure showing a tailgate assembly in the closed upright orientation and a sliding door in the closed orientation in accordance with a second embodiment.
Figure 18:
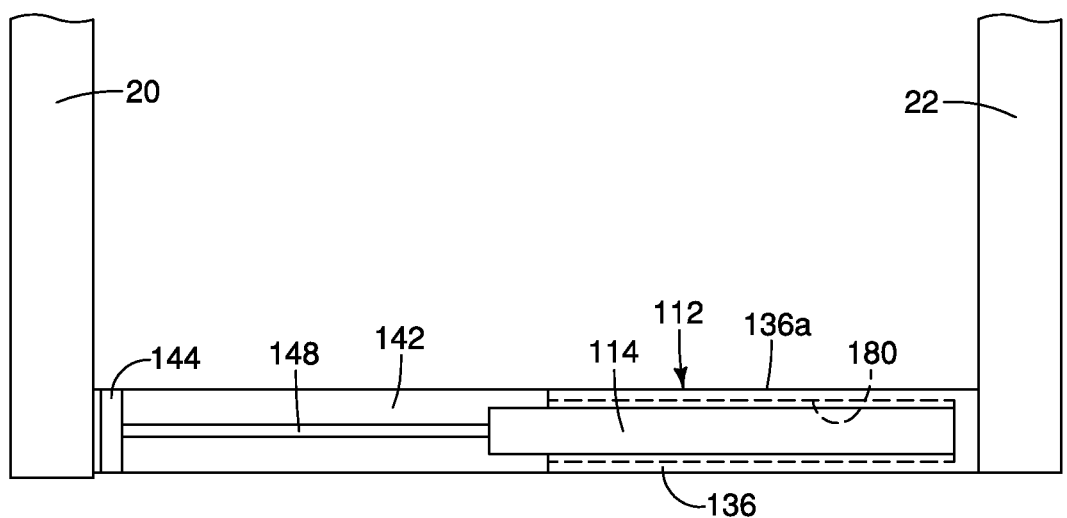
FIG. 18 is another top view of the cargo structure showing the tailgate assembly in the closed upright orientation and the sliding door in an open orientation where the sliding door is slid into a recess of the tailgate assembly in accordance with the second embodiment.

Referring now to FIGS. 17 and 18, a tailgate assembly 112 with a sliding door 114 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The tailgate assembly 112 includes a rearward panel 136 and a forward panel 136a that define a slot, hollow interior or pocket 180 therebetween. The tailgate assembly 112 further includes a sill portion 142 and an upright side section 144 that define a door opening. The sliding door 114 is movable along a lower track 148 from a closed orientation closing the door opening as shown in FIG. 17 to an open orientation exposing the door opening, as shown in FIG. 18. The hollow interior or pocket 180 includes an upper track (not shown) at least partially concealed therein. The sliding door 114 includes a lower slider mechanism (not shown) that engages the lower track 148 and an upper slider mechanism (not shown) that is configured and dimensioned to slide along the upper track (not shown) between the closed orientation and the open orientation.

Various portions of the vehicle 10, such as the cabin structure 16 and cargo structure 18 (other than the tailgate assembly 12) are conventional components that are well known in the art. Since these conventional components are well known in the art, these structures will not be discussed or illustrated in detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the tailgate assembly. Accordingly, these terms, as utilized to describe the present invention should be interpreted relative to a vehicle equipped with the tailgate assembly.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A tailgate assembly, comprising:
 a tailgate frame having a first portion and a second portion, the first portion having a rearward facing tailgate panel covering at least half of the tailgate frame and the second portion defining a door opening and a lower track; and
 a sliding door supported by the lower track such that the sliding door is movable between a closed orientation and an open orientation, the sliding door being configured to overlie a portion of the rearward facing tailgate panel when the sliding door is in the closed orientation and when viewed in a direction facing the rearward facing tailgate panel,
 the tailgate panel of the first portion of the tailgate frame having an upper track, and
 the sliding door having an upper slider mechanism extending between the sliding door and the rearward facing tailgate panel, the upper slider mechanism being configured and dimensioned to slide along the upper track between the closed orientation and the open orientation, a first end of the upper slide mechanism being connected to the sliding door and a second end of the upper slide mechanism being connected to a roller vertically disposed in the upper track, the second end of the upper slider mechanism being disposed higher than the first end of the upper slider mechanism.

2. The tailgate assembly according to claim 1, wherein the sliding door having a lower slider mechanism, the lower slider mechanism being configured and dimensioned to slide along the lower track as the sliding door moves between the closed orientation and the open orientation.

3. The tailgate assembly according to claim 2, wherein the sliding door covers the door opening while in the closed orientation and overlays the tailgate panel of the first portion while in the open orientation.

4. The tailgate assembly according to claim 1, wherein the first portion of the tailgate frame defining a hollow interior with an upper track at least partially concealed therein, and
 the sliding door has a lower slider mechanism, the lower slider mechanism being configured and dimensioned to slide along the lower track while moving between the closed orientation and the open orientation such that in the closed orientation, the sliding door blocks the door opening and in the open orientation the sliding door is located within the hollow interior of the first portion of the tailgate frame.

5. The tailgate assembly according to claim 1, wherein the tailgate frame includes support rods at opposite lower sides thereof such that the tailgate frame pivots about an axis defined by the support rods between an upright closed orientation and an inclined open orientation.

6. The tailgate assembly according to claim 5, wherein the tailgate frame includes latch mechanisms at opposite upper sides thereof such that with the tailgate frame in the upright closed orientation the latch mechanism engage strikers located at opposite sides of a cargo area structure retaining the tailgate from in the upright closed orientation, the latch mechanisms being releasable such that in a released orientation the tailgate is free to pivot to the inclined open orientation.

7. The tailgate assembly according to claim 1, wherein the second portion of the tailgate frame includes a sill portion that extends from a lower end of the first portion of the tailgate frame and an upwardly extending member.

8. The tailgate assembly according to claim 7, wherein the sliding door includes a sliding door latch mechanism attached thereto that is positioned and configured to engage a sliding door latch striker fixed to the upwardly extending member of the tailgate frame.

9. A tailgate assembly, comprising:
a tailgate frame having a first portion and a second portion, the first portion having frame elements defining a rectangular support structure, the second portion having a sill portion and an upwardly extending member, the sill portion and the upwardly extending member defining a door opening, at least the sill portion having a lower track;
a rearward facing tailgate panel attached to the rectangular support structure of the first portion; and
a sliding door supported by the lower track such that the sliding door is movable along the lower track between a closed orientation and an open orientation, the sliding door being configured to overlie a portion of the rearward facing tailgate panel when the sliding door is in the closed orientation and when viewed in a direction facing the rearward facing tailgate panel,
the tailgate panel of the first portion of the tailgate frame having an upper track, and
the sliding door having an upper slider mechanism extending between the sliding door and the rearward facing tailgate panel, the upper slider mechanism being configured and dimensioned to slide along the upper track between the closed orientation and the open orientation, a first end of the upper slide mechanism being connected to the sliding door and a second end of the upper slide mechanism being connected to a roller vertically disposed in the upper track, the second end of the upper slider mechanism being disposed higher than the first end of the upper slider mechanism.

10. The tailgate assembly according to claim 9, wherein the sliding door covers the door opening when in the closed orientation and overlays the tailgate panel of the first portion when in the open orientation.

11. The tailgate assembly according to claim 9, wherein the first portion of the tailgate frame defines a hollow interior with an upper track at least partially concealed therein, and
the sliding door has a lower slider mechanism, the lower slider mechanism being configured and dimensioned to slide along the lower track while moving between the closed orientation and the open orientation such that in the closed orientation, the sliding door blocks the door opening and in the open orientation the sliding door is located within the hollow interior of the first portion of the tailgate frame.

12. The tailgate assembly according to claim 9, wherein the tailgate frame includes support rods at opposite lower sides thereof such that the tailgate frame pivots about an axis defined by the support rods between an upright closed orientation and an open orientation.

13. The tailgate assembly according to claim 12, wherein the tailgate frame includes latch mechanisms at opposite upper sides thereof such that with the tailgate frame in the upright closed orientation the latch mechanism engage strikers located at opposite sides of a cargo area structure of a vehicle retaining the tailgate in the upright closed orientation, the latch mechanisms being releasable such that in a released orientation the tailgate is free to pivot to the inclined open orientation.

14. The tailgate assembly according to claim 9, wherein the sliding door includes a sliding door latch mechanism attached thereto that is positioned and configured to engage a sliding door latch striker fixed to the upwardly extending member of the tailgate frame.

* * * * *